3,804,905
PHENYL PROPARGYL THIOETHERS
Jay Philip O'Brien, Irvington, and Albert Israel Rachlin, Verona, N.J., assignors to Hoffmann-La Roche Inc., Nutley, N.J.
No Drawing. Application May 28, 1969, Ser. No. 828,731, now Patent No. 3,686,331, which is a division of application Ser. No. 485,904, Sept. 8, 1965, now Patent No. 3,499,805, which in turn is a continuation-in-part of abandoned application Ser. No. 433,209, Feb. 16, 1965. Divided and this application Mar. 6, 1972, Ser. No. 232,244
Int. Cl. C07c 43/20
U.S. Cl. 260—609 E
8 Claims

ABSTRACT OF THE DISCLOSURE

Anti-microbial phenyl 3-halopropargyl thioethers which are prepared by condensing a thiophenol with a 3-halopropyne.

CROSS REFERENCE TO RELATED APPLICATIONS

This application is a divisional application of Ser. No. 828,731, filed May 28, 1969, now U.S. Pat. 3,686,331, which in turn is a divisional application of Ser. No. 485,904, filed Sept. 8, 1965, now U.S. Pat. 3,499,805, which in turn is a continuation-in-part of application Ser. No. 433,209, filed Feb. 16, 1965, now abandoned.

DETAILED DESCRIPTION OF THE INVENTION

This application relates to novel propynyl ethers and novel propynyl thioethers and to processes for preparing and methods of using same. In one particular aspect the application relates to compounds of the formula

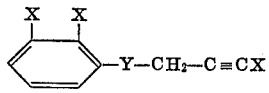

wherein X is halogen, i.e., chlorine, bromine, iodine or fluorine and Y is a sulfur or an oxygen atom.

The halogen substituents on the phenyl group can be either chlorine, bromine, iodine or fluorine, preferably chlorine or bromine, and they can be the same or different and can also be the same or different than the halogen on the acetylenic carbon which is preferably iodine or bromine. Compounds answering to this description are, for example, 2,3-dichlorophenyl 3-iodo-2-propynyl ether, 2,3-dibromophenyl 3-iodo-2-propynyl ether, 2,3-dichlorophenyl 3-bromo-2-propynyl ether, 2-chloro-3-bromophenyl 3-bromo-2-propynyl ether, 2,3-dichloro-1-(2-propynyl mercapto)-benzene and the like. Compounds of Formula I wherein Y is an oxygen atom constitute a preferred class.

The compounds of Formula I are useful as anti-bacterial and anti-fungicidal agents. For example, they are useful as disinfectants or sanitizers or they can be used in human or veterinary medicine as medicaments especially in diseases caused by a wide variety of bacteria and fungi for which these compounds have shown a high inhibitory effect. More particularly, the compound 2,3-dichlorophenyl 3-iodo-2-propynyl ether has exhibited unusual broad spectrum anti-bacterial activity of extremely high potency against both Gram-positive and Gram-negative bacteria, for example, against *Streptococcus pyrogenes* 4, *Diplococcus pneumoniae* 6301, *Staphylococcus aureus* 209, *Escherichia coli* J and *Salmonella typhosa*.

In addition to the extraordinary activity against Gram-positive and Gram-negative bacteria, this compound shows an inhibitory effect on a variety of fungi such as *Candida albicans*, *Tricophyton mentogrophytes*, *Microsporum audouini* and aspergilli. Of particular importance is the unexpectedly high activity against the fungi *Aspergillus niger*, *Aspergillus flavus* and *Aspergillus oryzae*. 2,3-dichloro-3-iodo-2-propynyloxybenzene, when tested against *Aspergillus niger*, *Aspergillus flavus* and *Aspergillus oryzae* in a modified Czapek media, produced 100 percent inhibition of growth at less than 5.0 p.p.m. This activity renders the compound particularly useful as an additive for the prevention of mildew in such things as fibrous materials, leather, textiles, wood, paper and the like. In this particular aspect of the invention the compound can be utilized, for example, as an additive in paints where it has been found to have a total inhibitory effect on the above-mentioned fungi when used in amounts of 1 percent by weight or less.

Various concentrations of the compound were incorporated into a polyvinyl acetate latex paint and an outside linseed oil paint. The paints were brush-coated onto both sides of sheets of filter paper and air dried for 48 hours. One-inch squares of the coated paper were placed on modified Czapek media in petri dishes inoculated with a spore suspension of *Aspergillus orzae* and incubated for 7 days at 28–30° C. Results of these tests were as follows:

TABLE I

| Conc., percent by weight of paint | Paint | Growth on paint | Zone of inhibition, mm. |
|---|---|---|---|
| 2.0 | Latex | No growth | 5 |
| 1.0 | do | do | 1 |
| 0.5 | do | Trace | 0 |
| 0.25 | do | Moderate | 0 |
| Control | do | Heavy | 0 |
| 2.0 | Oil | No growth | 10 |
| 1.0 | do | do | 10 |
| 0.5 | do | do | 1 |
| Control | do | Moderate to heavy | 0 |

One-inch squares of vegetable tanned leather were immersed in alcohol solutions of 2,3-dichlorophenyl 3-iodo-2-propynyl ether and air dried. The treated samples were placed on modified Czapek media, inoculated with a spore suspension of *Aspergillus niger* and incubated for 7 days at 28–30° C. Results were as follows:

TABLE II

| Conc., percent compound in alcohol (wt./vol.) | Growth on leather | Zone of inhibition, mm. |
|---|---|---|
| 0.5 | No growth | ¹ 10 |
| 0.2 | do | ¹ 10 |
| 0.1 | do | 10 |
| Control | Moderate growth | 0 |

¹ Complete inhibition of growth on agar.

The compounds of Formula I are useful as anti-bacterial and anti-fungal agents in preparations containing said compounds in admixture with a pharmaceutical organic or inorganic carrier suitable for local administration. They can be used, for example, as contact disinfectants or sanitizers, or applied topically to affected areas. As carriers there are used substances which do not react with the new compounds, for example, gelatin, lactose, starch, talc, vegetable oils, polyethylene glycols and other known carriers for medicaments. The pharmaceutical preparations may be, for example, in the form of powders, sprays, salves, creams or suppositories or in liquid form as solutions, e.g., tinctures, suspensions or emulsions. If desired, they may be sterilized and/or may contain auxiliary substances such as preserving, stabilizing, wetting or emulsifying agents.

A conventional pharmaceutical formulation such as a cream, tincture or the like containing 2,3-dihalophenyl 3-iodopropargyl ether of the type disclosed herein in amounts of about 1 percent or less by weight of the total formulation provides an effective anti-bacterial/anti-fungal composition for the treatment of inflammatory conditions amenable to topical therapy. An exemplary ointment composition (Cream Base A) incorporating 2,3-dichloro-3-iodopropargyl ether as the active ingredient can be formulated as follows:

Stearic acid, light mineral oil, Span 60, Nipagin and Nipasol were placed in a suitably jacketed kettle, melted and heated to 70° C. 2,3-dichloro-3-iodopropargyl ether was then added with agitation. In a separate suitably jacketed kettle there was placed water, sorbitol and Tween 60 and the mixture heated to 70° C. The amounts of each of the various components are indicated in the table below.

CREAM BASE A

| | Percent |
|---|---|
| 2,3-dichlorophenyl 3-iodo-2-propynyl ether | 1.02 |
| Stearic acid | 13.50 |
| Lt. mineral oil | 1.35 |
| Span 60 | 2.25 |
| Nipagin | 0.08 |
| Nipasol | 0.02 |
| Sorbitol | 4.50 |
| Tween 60 | 1.60 |
| Distilled water q.s. 100 | |
| pH, (approx.) | 5.1 |

The water phase was then added to the oil phase with agitation. The water was agitated for 5 minutes at 70° C. and then cooled to 50° and then cooled ot room temperature with agitation. The ability of the above composition to inhibit various organisms in conventional microbiological tests is shown below.

The ointment preparation was dissolved in dimethylsulfoxide and diluted with water and incorporated into Sabouraud-agar. At the desired concentration the agar was flooded with suspensions of *Candida albicans* and dermatophytes and incubated at 25° C. for 48 hours in the case of Candida and for 7 days in the case of dermatophytes. The minimum inhibitory concentrations (M.I.C.) are given in the following table.

TABLE III

Activity of ointments containing 2,3-dichlorophenyl 3-iodo-2-propynyl ether against bacteria and fungi in vitro

| Organism: | M.I.C. ($\mu$g./ml.) |
|---|---|
| T. mentagrophytes | 0.1 |
| M. audouini | 0.1 |
| C. albicans | 1.0 |

The ointment was tested by the agar-hole technique. Using a cork borer measuring 12.0 mm. in diameter, holes were cut in the center of an agar plate seeded with either bacteria or fungi and filled with the above ointment composition. Incubation for bacteria was 17° C. for 24 hours. *Candida albicans* was incubated at 25° C. for 48 hours while the dermatophytes were incubated at 25° C. for 7 days. The results of these experiments are expressed as zone inhibition and radius inhibition in the following table.

TABLE IV

Activity of ointments containing 2,3-dichlorophenyl 3-iodo-2-propynyl ether against bacteria and fungi in vitro

| Organism: | Zone of inhibition (mm.) |
|---|---|
| S. aureus 209 | 43.0 |
| E. coli J | 21.0 |
| C. albicans | 62.0 |

| Organism: | Radius of inhibition (mm.) |
|---|---|
| S. pyogenes 4 | 3.0 |
| D. pneumoniae 6301 | 3.0 |
| S. aureus 209 | 14.0 |
| E. coli J | 3.5 |
| C. albicans | 24.0 |

Compounds of Formula I are accessible by a variety of methods. The novel ether compounds can, for example, be prepared by reacting the appropriate 2,3-dihalophenol with 3-bromopropyne in the presence of anhydrous potassium carbonate, isolating the propynyl ether which forms and thereafter halogenating the acetylenic hydrogen for example by treatment with the appropriate halogen in the presenec of a strong base, e.g., sodium hydroxide. Alternatively in the case of iodine, the terminal acetylenic carbon can be iodinated by first forming the copper salt by treating a solution of a copper ammonia complex and thereafter iodinating the copper salt, for example, by treating with a mixture of potassium iodide and iodine. The above reaction can be suitably carried out in an inert organic solvent such as alcohol, acetone and the like. The reactions can be conveniently carried out at room temperature or above or below room temperature. However, it is preferred to operate at a temperature between about 0° C. and about 30° C. The end product can be readily recovered by any of the usual techniques such as filtration, evaporation, etc.

Alternatively the compounds of Formula I can be prepared by directly condensing a 1,3-dihalopropyne with 2,3-dihalophenol or 2,3-dihalothiophenol respectively. The condensation is suitably carried out in an inert organic solvent in the presence of a base. The reaction temperautre is not critical though it is preferred to operate at an elevated temperature suitably at the reflux temperature of the reaction mixture.

In another of its aspects this application relates to novel biocidally active nitrophenyl propargyl ethers and thioethers to methods and compositions for the control of microorganisms using these novel compounds which are highly toxic to microorganisms, particularly to fungi. More particularly, this aspect of the application relates to compounds of the formula

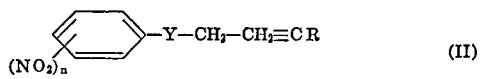 (II)

wherein *n* is an integer from 1 to 5, R is hydrogen or halogen and Y is a sulfur atom or an oxygen atom.

Compounds of Formula II wherein *n* is 1 to 2, Y is oxygen and X is halogen, especially bromine or iodine, constitute a preferred group. The 2,4-dinitro derivative is specifically distinguishable by virtue of its anti-fungal activity particularly against *T. mentagrophytes* and *M. audouini*.

The ethers of Formula II can be prepared by reacting the appropriate nitrophenol with a propargyl halide, preferably propargyl bromide, in the presence of an acid acceptor in a manner similar to the preparation of the 2,3-dihalophenylpropargyl ethers described above. As an acid acceptor, one can employ any suitable base such as, for example, sodium hydroxide, sodium methoxide, alkali metal salts such as sodium carbonate, potassium carbonate, etc., bicarbonates, e.g., sodium bicarbonate and the like. The reaction is conveniently carried out in any inert solvent preferably a polar solvent. Suitable solvents are, for example, water, ketones, e.g., acetone, etc., alkanols, e.g., the lower alkanols, methanol, ethanol, etc., lower alkyl nitriles such as acetonitrile and the like. In the case of the dinitro compounds it is preferred to use bicarbonate as the acid acceptor in a strongly polar solvent such as acetonitrile or lower alkanol. The reaction temperature is not critical, though it is preferred to operate at an elevated temperature, suitably at the reflux temperature of the reaction mixture. However, the reaction can be carried out at lower temperature, i.e., room temperature or below. The reaction starts upon mixing the reactants and is ordinarily completed in about 5–15 hours. Upon completion of the reaction, the reaction mixture is cooled to precipitate the inorganic salt formed in the reaction. The salt is filtered off and the filtrate distilled to recover the nitrophenyl 2-propynyl ether. Halogenation of the propynyl ether can be readily accomplished by reacting with a hypohalite. The reaction is suitably carried out in an inert solvent such as, for example, water, ethers, e.g., dioxane, tetrahydrofuran and the like. The hypohalite can be added to a solution of the propynyl ether or dissolved in an appropriate solvent to which the hypohalite can be added or, alternatively, the hypohalite can be prepared in situ by adding halogen and a suitable base such as sodium hydroxide and the like. Alternatively, iodination can be carried out via the copper salt as described above. Compounds of Formula II wherein R is halogen can be prepared directly by condensing a 1,3-dihalopropyne with the appropriate nitrophenol or nitrothiophenol respectively by procedure analogous to that described above.

The compounds of Formula II are specifically distinguished by their toxicity to molds, algae, yeast and especially to fungus. They are useful in the formulation of pharmaceutical formulations for local application in the treatment of fungal infections. Because of their fungicidal-fungistatic activity in minute quantities, these compounds are particularly adapted to industrial uses. Those compounds having a terminal iodo group have been found to be especially well suited for use as industrial fungicides. They are, for example, particularly well adapted for use as additives to plastics, paints, cosmetic emulsions and the like and in treating leather, wood, paper, fabrics and the like to prevent deterioration resulting from fungal action in these materials or in surfaces protected by these materials. When used in this way, these compounds have been found to be highly effective at low concentrations, extremely resistant to diminution of their anti-microbial action and conferring substantially no undesirable properties to the systems treated therewith. The compounds of this invention can be made suitable for anti-microbial application by adding microbicidal amounts to the compositions to be protected or by mixing a microbicidal amount with any conventional carrier, for example, by dissolving in alcohol, acetone or the like.

The suitability and effectiveness of these compounds in treating fabrics is demonstrated by the test results shown in Table V. The tests were conducted by immersing replicate 1-inch squares of cotton sheeting in alcohol solutions containing various concentrations of the test compounds. The treated fabrics were air-dried and subjected to Petri dish inoculation tests against *Aspergillus niger* and *Chaetomium globosum*. For comparative purposes, samples of fabric were treated with a standard fabric fungicide, 2,2'-methylenebis(4-chlorophenol). The inoculation materials were examined visually for the presence of growth after a 17-day incubation period and given a numerical rating. The numerical ratings used for this and all subsequent rates described herein have the following designations:

(1) No growth on sample.
(2) Trace growth on sample.
(3) Slight growth on sample.
(4) Moderate growth on sample.
(5) Heavy growth on sample.
  (A) Up to 20 mm. zone of inhibition around sample.
  (B) Greater than 20 mm. zone of inhibition around sample.
  (C) Complete inhibition on entire plate.

TABLE V.—FABRIC TESTS

| Compound | Conc. in alcohol, percent | A. niger | C. globosum |
|---|---|---|---|
| 4-nitrophenyl 3-iodo-2-propynyl ether | 0.2 | 1 (C) | 1 |
| Do | 0.1 | 1 (C) | 1 |
| Do | 0.075 | 1 (B) | 1 |
| Do | 0.050 | 1 (B) | 1 |
| Do | 0.025 | 2-3 | 1-2 |
| Do | 0.010 | 3 | 4-5 |
| Do | 0.005 | 4 | 5 |
| 3-nitrophenyl 3-iodo-2-propynyl ether | 0.1 | 1 (C) | 1 |
| Do | 0.05 | 1 (C) | 1 |
| 4-nitro-1-(3-iodo-2-propynylmercapto)benzene | 0.1 | 1 | 1 |
| Do | 0.05 | 1 (A) | 1 |
| 2-nitrophenyl 3-iodo-2-propynyl ether | 0.1 | 1 (B) | 1 |
| Do | 0.05 | 1 (B) | 1 |
| 2,4-dinitrophenyl 3-iodo-2-propynyl ether | 0.1 | 1 (C) | 1 |
| Do | 0.05 | 1 (C) | 1 |
| 2,2'-methylenebis(4-chlorophenol) | 0.5 | 1 (A) | 1 |
| Do | 0.2 | 1-2 | 1 |
| Do | 0.1 | 3 | 1-2 |
| Do | 0.05 | 4 | 4 |
| Control | | 5 | 5 |

The suitability of the novel compounds of Formula II for treating leather to prevent against microbial deterioration is demonstrated by the results of the following test. Replicate 1-inch squares of vegetable tanned leather were immersed in alcohol solutions containing various concentrations of the compound and were air-dried. Leather samples treated with a standard leather preservative (p-nitrophenol) were tested at the same time for comparative purposes. The treated samples were subjected to Petri dish inoculation tests with *Aspergillus niger* before and after various exposure tests. The exposure tests were as follows.

(A) Twenty-four hours in a circulating air oven at 60° C.
(B) Twenty-four hours immersion in 100 ml. of cold tap water with four complete water changes during this period.
(C) Exposed outdoors on an unsheltered rack for 13 days.

The results of the microbiological tests after a 14-day inoculation period are recorded in Table VI.

TABLE VI.—LEATHER TESTS
(A. Niger)

| Compound | Conc. in alcohol, percent | Unexposed | Oven aged | Leached | Weathered |
|---|---|---|---|---|---|
| 4-nitrophenyl 3-iodo-2-propynyl ether | 0.2 | 1 | 1 | 1 (C) | 1 |
|  | 0.1 | 1 | 1 | 1 (A) | 1 |
|  | 0.05 | 1 | 1 | 1 | 1 |
| 3-nitrophenyl 3-iodo-2-propynyl ether | 0.2 | 1 (B) | | 1 (B) | 1 (B) |
|  | 0.1 | 1 (B) | | 1 (A) | 1 |
|  | 0.05 | 1 (A) | | 1 (A) | 1-2 |
| 4-nitro-1-(3-iodo-2-propynylmercapto)benzene | 0.2 | 1 | | 1-2 | 1 |
|  | 0.1 | 1 | | 1 | 2-3 |
|  | 0.05 | 1 | | 1-2 | 3 |
| 2-nitrophenyl-3-iodo-2-propynyl ether | 0.2 | 1 (B) | | 1 (A) | 1 (A) |
|  | 0.1 | 1 (A) | | 1 (A) | 1 |
|  | 0.05 | 1 | | 1 | 1 |
| 2,4-dinitrophenyl 3-iodo-2-propynyl ether | 0.2 | 1 (B) | | 1 (B) | 1 (B) |
|  | 0.1 | 1 (A) | | 1-2 | 1 |
|  | 0.05 | 1 (A) | | 1-2 | 2 |
| p-Nitrophenol | 0.2 | 1 | 1 | 3 | 2 |
|  | 0.1 | 1-2 | 3 | 4 | 4 |
|  | 0.05 | 3-4 | 4 | 4-5 | 4-5 |
| Control | | 5 | 5 | 5 | 5 |

The suitability of the compounds of Formula II for incorporation into plastic compounds so as to inhibit microbial deterioration is demonstrated by the following test. Plastic films were cast from solvent solutions containing a vinyl chloride-acetate resin, a susceptible plasticizer and several concentrations of a compound of this invention. The finished films were cut into small squares and subjected to Petri dish inoculation tests with *Aspergillus flavus* on mineral salts and dextrose-mineral salt agar media. Results of these tests are illustrated in Table VII.

squares and subjected to Petri dish inoculation tests against *Pullularia pullulans*, *Aspergillus oryzae* and *Aspergillus niger*. Another sheet was exposed outdoors for 22 days and hen subjected to the inoculation tests. A third sheet was heat-aged in an oven at 60° C. for 96 hours, then leached in tap water for 24 hours prior to the microbiological tests. Finally, the prepared paints were stored in jars in the laboratory for 2 months, then coated onto filter paper to be tested against the fungi. Table VIII shows a compilation of the test results on all samples after 4-week incubation periods.

TABLE VIII.—PAINT TESTS

| Compound | Conc. by wt. of paint, percent | Unexposed | | | Weathered | | | Oven aged and leached | | | Storage stability | | |
|---|---|---|---|---|---|---|---|---|---|---|---|---|---|
| | | P.p.[1] | A.o. | A.n. | P.p. | A.o. | A.n. | P.p. | A.o. | A.n. | P.p. | A.o. | A.n. |
| 4-nitrophenyl 3-iodo-2-propynyl ether | 0.25 | 1 | 2 | 2 | 1 | 3 | 2 | 1 (B) | 1 (A) | 2 | 1 (A) | 2 (A) | 1 |
| | 0.50 | 1 (A) | 2 | 2 | 1 (A) | 2 (A) | 2 | 1 (B) | 1 (A) | 2 | 1 (A) | 2 (A) | 1 |
| | 1.0 | 1 (A) | 2 | 1 (A) | 1 (A) | 2 (A) | 1 (A) | 1 (B) | 1 (A) | 2 | 1 (A) | 1 (A) | 1 (A) |
| Phenyl mercuric acetate | 0.25 | 1 (A) | 3 | 1 (C) | 1 | 3 | 2 | 1 (B) | 1 (B) | 2 | 1 (A) | 1 (C) | 1 (C) |
| | 0.50 | 1 (B) | 1 (C) | 1 (C) | 1 (A) | 1 (A) | 1 (C) | 1 (B) | 1 (C) | 2 | 1 (A) | 1 (C) | 1 (C) |
| Copper 8-quinolinolate | 0.25 | 1 (A) | 3 | 2 | 1 | 3 | 2 | 1 (A) | 1 | 2 | 1 (A) | 2 | 2 |
| | 0.50 | 1 (A) | 2 | 2 | 1 | 3 | 2 | 1 (A) | 2 | 2 | 1 (A) | 2 | 2 |
| Control | | 4 | 5 | 5 | 3 | 4 | 5 | 2 | 2 | 3-4 | 3-4 | 5 | 5 |
| 3-nitrophenyl 3-iodo-2-propynyl ether | 1.0 | 1 | 1 (A) | 1 (B) | | | | | | | | | |
| 4-nitro-1-(3-iodo-2-propynylmercapto benzene | 1.0 | 3-4 | 3 | 3 | | | | | | | | | |
| 2-nitrophenyl 3-iodo-2-propynyl ether | 1.0 | 1 (A) | 1 (A) | 1 (A) | | | | | | | | | |
| 2,4-dinitrophenyl 3-iodo-2-propynyl ether | 1.0 | 1 | 1 (A) | 1 (A) | | | | | | | | | |

[1] P.p.=P. pullulans; A.o.=A. oryzae; A.n.=A. niger.

TABLE VII.—PLASTIC TESTS

| Compound | Conc. by wt. of plastic, percent | Dextrose-M.S. agar | M.S. agar |
|---|---|---|---|
| 4-nitrophenyl 3-iodo-2-propynyl ether | 1.0 | 1(B) | 1 |
| | 0.5 | 1 (A) | 1 |
| | 0.25 | 1-2 | 1 |
| 3-nitrophenyl 3-iodo-2-propynyl ether | 0.5 | 1 (A) | 1 |
| 4-nitro-1-(3-iodo-2-propynylmercapto) benzene | 0.5 | 2 | 3 |
| 2-nitrophenyl 3-iodo-2-propynyl ether | 0.5 | 1 (A) | 2 |
| 2,4-dinitrophenyl 3-iodo-2-propynyl ether | 0.5 | 1 (A) | 3 |
| Control | | 4 | 4 |

Still another of the many antimicrobial applications in which the novel compounds of Formula II have found particular usefulness in preventing microbial growth and microbially induced degradation in films formed from both oil and water base paints. Compounds of the present invention when incorporated into an oil paint or a water base paint in an amount between about 0.2 percent and 2.0 percent by weight and the resulting paint employed to paint a wood surface, give excellent control against mildew formation when exposed to rigorous conditions of temperature and humidity. The added compound does not adversely affect the shelf life of the paint nor does it modify the color characteristics and remains effective for an extended period of time.

The suitability of the compounds of Formula II for use as paint additive to protect against microbiological deterioration is demonstrated by the results of the following tests. Various concentrations of compounds of this invention, as well as standard paint additives phenyl mercuric acetate and copper 8-quinolinolate, were milled by hand into a white latex paint. The treated paints were brushed onto both sides of sheets of filter paper and air-dried. One sheet of painted paper was cut into small The suitability of the compounds of Formula II for use as additives to cosmetic emulsions is demonstrated by the following tests. Cosmetic creams formulated from boiling water emersions with a non-ionic surfactant were prepared containing various concentrations of compounds of this invention and also with methyl p-hydroxybenzoate. Jars containing these creams were inoculated with *Aspergillus niger* and incubated for a 21-day period. Samples were re-inoculated after 7 and 14 days of incubation period. Table IX shows a summary of the results of these tests.

TABLE IX.—COSMETIC EMULSION TESTS

| Compound, percent | Conc. by wt. | Growth |
|---|---|---|
| 4-nitrophenyl 3-iodo-2-propynyl ether | 0.025 | 1 |
| | 0.050 | 1 |
| | 0.10 | 1 |
| 3-nitrophenyl 3-iodo-2-propynyl ether | 0.05 | 1 |
| 4-nitro-1-(3-iodo-2-propynylmercapto)benzene | 0.05 | 1 |
| 2-nitrophenyl 3-iodo-2-propynyl ether | 0.05 | 1 |
| 2,4-dinitrophenyl 3-iodo-2-propynyl ether | 0.05 | 1 |
| Methyl p-hydroxy benzoate | 0.10 | 2 |
| | 0.20 | 1 |
| Control | | 4 |

The compounds of Formula II are particularly noteworthy anti-fungal agents because of their ability to protect oil-water or two-phase systems since most of the conventional microbicides are inactive in these systems. It is a particularly significant property of these compounds that they are effective in the presence of non-ionic surfaces active agents whereas other anti-fungal agents are not. The compounds are especially valuable for industrial purposes because of their high anti-fungal action in minute quantities and the almost total lack of adverse effects. These compounds are inert to the oils and pigments in paints and, therefore, do not cause discoloration or shorten the shelf life. The small quantities required have no effect on such other properties of paints as brushing and spreading characteristics. These compounds are also inert to the ingredients of conventional cosmetic preparations and, therefore, find a wide application in this area.

In still another aspect this application relates to mixed halonitrophenylpropargyl ethers of the formula

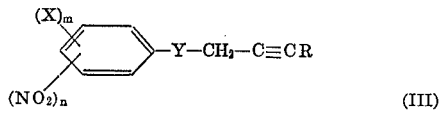

$$\text{(X)}_m \text{C}_6\text{H}_{3-m-n}(\text{NO}_2)_n-Y-CH_2-C\equiv CR \quad \text{(III)}$$

wherein $m$ and $n$ are integers from 1 to 4 such that the sum of $m$ and $n$ is not greater than 5; X is halogen preferably chlorine; R is hydrogen or halogen, preferably iodine and Y is a sulfur or an oxygen atom.

The compounds of Formula III are useful as anti-bacterial/anti-fungal and insecticidal agents. The compounds wherein R is hydrogen are particularly good insecticidal agents especially when used in the formulation of insecticidal compositions in conjunction with carbamate insecticides such as 1-naphthyl N-methyl carbamate. The compounds wherein R is halogen are notable for their anti-bacterial/anti-fungal properties. They are useful in the treatment of diseases caused by a wide variety of bacteria and fungi. They are also useful as additives in such materials as paints, leather, textiles and other fibrous materials to inhibit the growth of a variety of fungi such as *Aspergillus niger* and *Staphylococcus aureus*. Compounds of Formula III wherein Y is oxygen and $m$ and $n$ are each 1 constitute a preferred group. The compound 2-nitro-4-chlorophenyl 3-iodopropargyl ether is specifically distinguishable by its inhibitory effect upon the growth of the fungi *Aspergillus niger*, *P. citrinum* and *Staphylococcus aureus* and algae *Chlorella vulgaris* and *V. viridis*. The compounds of Formula III can be utilized in the form of conventional pharmaceutical and insecticidal preparations as described elsewhere in this application. The ethers of Formula III, wherein R is hydrogen like those of Formulas I and II, are prepared by condensing an appropriately substituted phenol or thiophenol with bromopropyne. The halogenation of the terminal carbon can be effected by any of the usual procedures for halogenating acetylenic compounds. Alternatively, compounds of Formula III wherein R is halogen can be obtained directly by condensing a 1,3-dihalopropyne with the appropriately substituted phenol or thiophenol utilizing procedures analogous to those described above.

The starting phenols and thiophenols are products known to the art and prepared by known processes. The manner of preparing the novel compounds of this application will be more fully understood from the following examples which are not to be construed as limitative of the invention. All temperatures are in degrees centigrade and all melting points are uncorrected.

EXAMPLE 1

Preparation of 2,3-dichlorophenyl 3-iodo-2-propynyl ether

To a 2-liter 3-neck round bottom flask equipped with a stirrer and a reflux condenser were charged 200 g. (1.2 moles) of 2,3-dichlorophenol, 160 g. (1.3 moles) of 3-bromopropyne, 186 g. (1.3 moles) of anhydrous potassium carbonate and 1.0 liter of pure acetone. After the reaction mixture was stirred and refluxed for 8 hours, it was cooled to room temperature. The solids were filtered and washed well with 500 ml. of acetone. The solvent was evaporated at 60° in vacuo and the residue was dissolved in 700 ml. of ethanol. The crystals which formed on chilling in an ice-water bath were filtered and washed well with 500 cc. of water. After drying 48 hours in a vacuum desiccator with anhydrous calcium chloride as the desiccant there was obtained 2,3-dichlorophenyl 2-propynyl ether, M.P. 47–49° C.

To a 1 liter 3-neck round bottom flask equipped with a stirrer, a dropping funnel and a thermometer were charged 28.8 g. (0.14 moles) of 2,3-dichlorophenyl 2-propynyl ether prepared as above and 300 ml. of pure methanol. To the vigorously stirred solution were added simultaneously 48 g. (0.20 moles) of iodine in small portions and 180 ml. of a 10 percent aqueous sodium hydroxide solution (0.45 moles) dropwise over a period of 15 minutes while the reaction temperature was kept at 20–25° by means of an ice-water bath. After stirring for 30 minutes longer at room temperature, the resulting precipitate was filtered and washed well with 200 ml. of water. The solids were dried 24 hours in a vacuum desiccator with anhydrous calcium chloride as the desiccant to give 2,3-dichlorophenyl 3-iodo-2-propynyl ether, M.P. 58–59°.

EXAMPLE 2

Preparation of 2,3-dichlorophenyl 3-bromo-2-propynyl ether

To a 250 ml. 3-neck round bottom flask equipped with a magnetic stirrer and thermometer was added 50 ml. of a 10 percent aqueous sodium hydroxide solution (0.13 moles). After the solution was cooled to 5° by means of an ice-water bath, 6.4 g. (0.04 moles) of bromine was added. To the cold yellow solution was added a solution of 4.0 g. (0.02 moles) of 2,3-dichlorophenyl 2-propynyl ether in 30 ml. of dioxane. After the reaction mixture was stirred for 45 minutes at 5–10°, the solvents were evaporated at 60° in vacuo. The solids which formed were slurried with 100 ml. of water, filtered, washed with 200 ml. of water and dried. The crude compound was dissolved in 50 ml. of petroleum ether (B.P. 30–60° C.). After cooling the crystals were filered and air dried to yield 2,3-dichlorophenyl 3-bromo-2-propynyl ether, M.P. 68–69°.

EXAMPLE 3

Preparation of 2,3-dichlorophenyl 3-chloro-2-propynyl ether

To a 500 ml. 3-neck round bottom flask equipped with a stirrer, reflux condenser, dropping funnel and calcium chloride drying tube were added 2.6 g. (0.11 mole) of magnesium turnings and 20 ml. of anhydrous ether. Ethyl bromide (2.5 g., 0.11 mole), dissolved in 20 ml. of anhydrous ether, was added dropwise in order to maintain a gentle reflux and the reaction was then refluxed an additional 15 minutes. 2,3-dichlorophenyl 2-propynyl ether (20.1 g., 0.10 mole), dissolved in 50 ml. of anhydrous ether, was added dropwise over a period of 15 minutes. After the reaction mixture was refluxed for 5 hours, 19.1 g. (0.10 mole) of p-toluenesulfonyl chloride was added in small portions over a period of 15 minutes and refluxing was continued for 17 hours. The reaction mixture was cooled in an ice bath and acidified with 100 ml. of 3 N aqueous hydrochloric acid. The aqueous layer was extracted twice with 150 ml. of ether. The combined ether extracts were washed twice with 100 ml. of water, dried over anhydrous sodium sulfate, filtered and evaporated in vacuo at 40°. The oily residue was poured onto a column containing 300 g. of silica gel. The column was washed with six 200 ml. portions of petroluem ether (B.P. 30–60°) and the bulked eluates were evaporated in vacuo at 60°. The residue was dissolved in 100 ml. of petroleum ether (B.P. 30–60°). After chilling in an ice bath, the crystals were filtered to give 2,3-dichlorophenyl 3-chloro-2-propynyl ether, M.P. 67–68°.

EXAMPLE 4

Preparation of 2,3-dibromophenyl 3-iodo-2-propynyl ether

Into a 500 ml., three neck flask, equipped with a mechanical stirrer and a reflux condenser topped with a CaCl₂ tube attached to a gas absorption trap, were placed 100 g. (0.406 moles) of 2-bromo-3-nitrobenzoic acid and 150 ml. of thionyl chloride. The suspension was stirred and heated on a steam bath for one hour.

The resulting solution was distilled under reduced pressure, the residue was resuspended twice in 50 ml. of benzene and the solvent was distilled each time to give a dry residue of 2-bromo-3-nitrobenzoylchloride, M.P. 64–67° dec.

108 g. (0.406 moles) of 2-bromo-3-nitrobenzoylchloride, prepared as above was dissolved in 200 cc. of benzene and the solution was poured into a 3-liter, three neck flask containing 1800 ml. of concentrated ammonium hydroxide. The mixture was stirred mechanically for at least five hours. The white precipitate was filtered, pressed, washed well with water and dried to give 2-bromo-3-nitrobromide, M.P. 170–172°.

A 2-liter, three neck flask provided with a mechanical stirrer, reflux condenser and thermometer was charged with 49 g. (0.2 mole) of 2-bromo-3-nitrobenzamide prepared as above, 96 ml. of a solution, freshly prepared, of sodium hypochlorite containing 16.8 percent of active chlorine (0.2 mole plus 10 percent3, 100 ml. of 10 percent KOH solution and 600 ml. of water. The resulting mixture was stirred and heated slowly to reflux. Stirring and refluxing were continued for 15 minutes and then the mixture was allowed to cool to room temperature. The crude, reddish precipitate of 2-bromo-3-nitroaniline was filtered, washed well with water and dried. The product melted at 90–92°.

Concentrated sulfuric acid (130 ml.) was placed in a 2-liter, three neck flask fitted with a mechanical stirrer and a thermometer and 19 g. (0.275 mole) of solid sodium nitrite was added over a period of 10–15 minutes with stirring. After the addition was completed the temperature was raised to 70° and the mixture was stirred until the sodium nitrite was dissolved. The solution was cooled to 5–10° and a solution of 54 g. (0.25 mole) of 2-bromo-3-nitroaniline in 50 ml. of conc. sulfuric acid and 500 ml. of acetic acid was added slowly at room temperature with stirring. After the addition was completed, the solution was stirred for 2 hours. A solution of 50 g. (0.35 mole) of cuprous bromide in 250 ml. of 48 percent hydrobromic acid was prepared in a 2-liter three neck flask, provided with a mechanical stirrer and thermometer and the diazonium solution was added in portions with stirring at room temperature. The reaction mixture was warmed to 60° for 20 minutes. 800 ml. of ice-water was added, the precipitate was filtered, washed with water and dried. The 2,3-dibromonitrobenzene melted at 81–82°.

31 g. of iron (40 mesh), 200 ml. of water and 3.2 ml. of glacial acetic acid were placed into a 500 ml. three neck flask provided with a stirrer, reflux condenser, thermometer and a dropping funnel. The mixture was refluxed for 30 minutes with stirring. A solution of 28.1 g. (0.1 mole) of 2,3-dibromonitrobenzene in 120 ml. of dioxane was added dropwise to the refluxing mixture. After the addition was completed, stirring and refluxing were continued for one hour. The mixture was cooled to 60° and 21 g. of solid sodium carbonate and 3 g. of Norit added. Stirring was continued for an additional 15 minutes and then it was filtered through a thin layer of Hyflo. The cake was washed with 350 ml. of dichloromethane. The dichloromethane was separated from the aqueous phase, washed with water, dried over sodium sulfate and distilled under reduced pressure. The residue, 2,3-dibromoaniline, melted at 48–50°.

Concentrated sulfuric acid (72 ml.) was placed in a 500 ml. three neck flask fitted with a mechanical stirrer and a thermometer and 7.2 g. (0.014 mole) of solid sodium nitrite was added over a period of 10–15 minutes with stirring. After the addition was completed the temperature was raised to 70° and the mixture was stirred until all the sodium nitrite dissolved. The solution was cooled to room temperature and a solution of 26 g. (0.104 mole) of 2,3-dibromoaniline in 80 ml. of glacial acetic acid was added portionwise with stirring at such a rate that the reaction temperature remained at about 30°. After the addition was completed the solution was stirred at room temperature for 2 hours and then at 50° for 30 minutes. The solution was tested with potassium iodide starch paper for the presence of unreacted sodium nitrite. Solid urea was added until a negative test resulted.

The diazonium compound prepared in this way was added by means of a dropping funnel to a boiling solution of 250 g. of cupric sulfate in 220 ml. of water, contained in a 1-liter three neck flask set up for steam distillation. A current of steam was introduced into the boiling solution while the diazonium solution was added dropwise from the central neck. The heating was regulated in such a way that the amount of liquid in the flask remained constant. The distillate was extracted with 3× 200 ml. of ethyl ether, the ether solution was washed with a small amount of water, dried and distilled under reduced pressure. The 2,3-dibromophenol obtained melted at 58–62°. Recrystallized from petroleum ether (30–60°) the product had a melting point of 64–65°.

A 250 ml. three neck flask, provided with a mechanical stirrer and a reflux condenser was charged with 22.5 g. (0.09 mole) of 2,3-dibromophenol, 14 g. of potassium carbonate, 12 g. (0.09 mole plus 10 percent) of propargyl bromide and 100 ml. of acetone. The mixture was stirred and heated to reflux on a steam bath for 3 hours. The reaction mixture was cooled to room temperature and the precipitate of inorganic salt was filtered. The cake was washed with 20 ml. of acetone and the acetone solution was distilled under reduced pressure to give an almost white residue of 2,3-dibromophenyl 2-propynyl ether melting at 42–48°.

Recrystallized from petroleum ether (30–60°) the product melted at 49–50°.

15 g. (0.052 mole) of 2,3-dibromophenyl 2-propynyl ether and 90 ml. of methanol were placed into a 250 ml. three neck flask fitted with a mechanical stirrer, reflux condenser and thermometer. The mixture was stirred at room temperature until solution was complete and 14.4 g. of iodine (0.052 mole plus 10 percent) and 45 ml. of 10 percent NaOH solution were added simultaneously. The temperature rose to 40–45° and a white precipitate was formed. The reaction mixture was allowed to cool at room temperature and was filtered. The cake was washed with a solution of 5 percent potassium iodide and then with water. The dry, semi-white 2,3-dibromophenyl 3-iodo-2-propynyl ether melted at 72–77°. Recrystallized from ligroin (60–90°) it melted at 82–84°.

EXAMPLE 5

Preparation of 2-nitrophenyl 2-propynyl ether

A 1 liter three-neck flask, provided with a mechanical stirrer and a reflux condenser was charged with 70 g. (0.5 mole) of 2-nitrophenol, 65.5 g. (0.55 mole) of propargyl bromide, 76 g. (0.55 mole) of potassium carbonate and 500 ml. of acetone. The mixture was stirred and heated to reflux on a steam bath for 10 hours. The reaction mixture was cooled to room temperature and the precipitate of inorganic salt was filtered off. The cake was washed with 50 ml. of acetone and the combined acetone filtrates were distilled under reduced pressure. The semi-white residue of 2-nitrophenyl 2-propynyl ether melted at 72–74° C. Recrystallized from ethanol it melted at 74–76° C.

EXAMPLE 6

Preparation of 2-nitrophenyl 3-iodo-2-propynyl ether

Fifty-three grams (0.3 mole) of 2-nitrophenyl 2-propynyl ether and 1000 ml. of methanol were placed into a 2 liter three-neck flask fitted with a mechanical stirrer, reflux condenser and thermometer. The mixture was stirred at room temperature until solution was complete and 84 g. (0.33 mole) of iodine and 300 ml. of 10 percent sodium hydroxide solution were added simultaneously. The temperature rose to 40–45° C. and a white precipitate was formed. The reaction temperature was allowed to cool to room temperature and the mixture was filtered. The cake was washed with a solution of 5 percent potassium iodide and then with water. The dry, almost white 2-nitrophenyl 3-iodo-2-propynyl ether melted at 94–96° C. Recrystallized from ethanol it melted at 96–98° C.

EXAMPLE 7

Preparation of 3-nitrophenyl 2-propynyl ether

A 1 liter three-neck flask, provided with a mechanical stirrer and a reflux condenser was charged with 70 g. (0.5 mole) of 3-nitrophenol, 65.5 g. (0.55 mole) of propargyl bromide, 76 g. (0.55 mole) of potassium carbonate and 500 ml. of acetone. The mixture was stirred and heated to reflux on a steam bath for 10 hours. The reaction mixture was cooled to room temperature and the precipitate of inorganic salt was filtered off. The cake was washed with 50 ml. of acetone and the combined acetone filtrates were distilled under reduced pressure. The almost white residue of 3 - nitrophenyl 2 - propynyl ether melted at 70–72° C. Recrystallized from ethanol it melted at 67–69° C.

EXAMPLE 8

Preparation of 3-nitrophenyl 3-iodo-2-propynyl ether

Fifty-three grams (0.3 mole) of 3-nitrophenyl 2-propynyl ether and 1000 ml. of methanol were placed into a 2 liter three-neck flask fitted with a mechanical stirrer, reflux condenser and thermometer. The mixture was stirred at room temperature until solution was complete and 84 g. (0.33 mole) of iodine and 300 ml. of 10 percent sodium hydroxide solution were added simultaneously. The temperature rose to 40–45° C. and a white precipitate was formed. The reaction temperature was allowed to cool to room temperature and the mixture was filtered. The cake was washed with a solution of 5 percent potassium iodide and then with water. The dry, semi-white 3-nitrophenyl 3-iodo-2-propynyl ether melted at 85–87° C. Recrystallized from ligroin (60–90°), it melted at 88–90° C.

EXAMPLE 9

Preparation of 4-nitrophenyl 2-propynyl ether

To a 1 liter 3-neck round bottom flask equipped with a stirrer and a reflux condenser were charged 70.0 g. (0.50 mole) of 4-nitrophenol, 65.5 g. (0.55 mole) of 3-bromopropyne, 76.2 g. (0.55 mole) of anhydrous potassium carbonate and 500 ml. of pure acetone. After the reaction mixture was stirred and refluxed for 8 hours, it was cooled to room temperature. The solids were filtered and washed well with 500 ml. of acetone. The solvent was evaporated at 60° in vacuo and the residue was dissolved in 700 ml. of ethanol. The crystals which formed on chilling in an ice-water bath were filtered and washed well with 500 cc. of water. After drying 48 hours in a vacuum desiccator with anhydrous calcium chloride as the desiccant there was obtained 4-nitrophenyl 2-propynyl ether, M.P. 114–116° C.

EXAMPLE 10

Preparation of 4-nitrophenyl 3-iodo-2-propynyl ether

To a 1 liter 3-neck round bottom flask equipped with a stirrer, a dropping funnel, a reflux condenser and a thermometer were charged 17.7 g. (0.10 mole) of 4-nitrophenyl 2-propynyl ether prepared as above and 500 cc. of pure methanol. The mixture was stirred and refluxed until all the solids were dissolved. To the vigorously stirred solution, which was cooled to 45–50° C., were added simultaneously 28 g. (0.11 mole) of iodine in small portions and 100 ml. of a 10 percent aqueous sodium hydroxide solution (0.25 mole) dropwise over a period of 15 minutes while the reaction temperature was kept below 50° C. After stirring for 30 minutes longer at room temperature, the reaction mixture was cooled in an ice-water bath. The solids were filtered, washed well with 200 ml. of water and dried 24 hours in a vacuum desiccator with anhydrous calcium chloride as the desiccant to give 4-nitrophenyl 3-iodo-2-propynyl ether, M.P. 187–188° C.

EXAMPLE 11

Preparation of 2,4-dinitrophenyl 2-propynyl ether

A 2 liter three-neck flask, equipped with a mechanical stirrer and a reflux condenser was charged with 93 g. (0.5 mole) of 2,4-dinitrophenol 65.5 g. (0.55 mole) of propargyl bromide, 44 g. of solid sodium hydroxide and 700 ml. of water. The mixture was stirred and heated on a steam bath for 24 hours and then it was acidified with dilute (1:1) hydrochloric acid and allowed to cool to room temperature. The precipitate was filtered and washed well with water. The dry reaction product weighed 102 g. and melted at 75–82° C. The crude product was suspended in 350 ml. of ethyl acetate. The suspension was washed with 2× 200 of a 5 percent sodium hydroxide solution, then with water and the organic layer was dried over sodium sulfate and distilled under reduced pressure. The crude residue of 2,4-dinitrophenyl 2-propynyl ether melted at 84–88° C. Recrystallized from ethanol it melted at 98–100° C.

EXAMPLE 12

Preparation of 2,4-dinitrophenyl 3-iodo-2-propynyl ether

Sixty-six grams (0.3 mole) of 2,4-dinitrophenyl 2-propynyl ether and 1200 ml. of methanol were placed into a 2 liter three-neck flask fitted with a mechanical stirrer, reflux condenser and thermometer. The mixture was stirred at 35–40° C. until solution was complete and 84 g. (0.33 mole) of iodine and 300 ml. of 10 percent sodium hydroxide solution were added simultaneously. The temperature rose to 50–55° C. and a white precipitate was formed. The reaction temperature was allowed to cool to room temperature and the reaction mixture was filtered. The cake was washed with a solution of 5 percent potassium iodide and then with water. The dry, semi-white 2,4-dinitrophenyl 3-iodo-2-propynyl ether thus obtained melted at 80–86° C. Recrystallized from ethanol it melted at 112–114° C.

EXAMPLE 13

2,6-dinitrophenyl 2-propynyl ether

A 1 liter three-neck flask, provided with a mechanical stirrer and a reflux condenser, was charged with 37 g. (0.2 mole) of 2,6-dinitrophenol, 29 g. (0.24 mole) of propargly bromide, 24 g. (0.24 mole) of potassium bicarbonate and 600 ml. of acetonitrile. The mixture was stirred and heated to reflux on a steam bath for 24 hours. The reaction mixture was cooled to room temperature and the precipitate of inorganic salt was filtered. The cake was washed with 20 ml. of acetonitrile and the combined acetonitrile filtrates were distilled under reduced pressure. The almost white residue of 2,6-dinitrophenol 2-propynyl ether melted at 58–62°.

EXAMPLE 14

2,6-dinitrophenyl 3-iodo-2-propynyl ether

Twenty-two grams (0.1 mole) of 2,6-dinitrophenyl 2-propynyl ether and 300 ml. of methanol were placed into a 1 liter three-neck flask provided with a mechanical stirrer, reflux condenser and thermometer. The mixture was stirred at 30–35° until solution was complete and 28 g. (0.11 mole) of iodine and 100 ml. of 10% sodium hydroxide solution were then added simultaneously. The temperature rose to 40–45° and a white precipitate was formed. The reaction mixture was allowed to cool to room temperature and was filtered. The cake was washed with a solution of 5% potassium iodide and then with water. The dry, 2,6-dinitrophenyl 3-iodo-2-propynyl ether melted at 90–94°.

EXAMPLE 15

Preparation of 4-chloro-2-nitrophenyl 2-propynyl ether

A 2 liter three-neck flask fitted with a mechanical stirrer and a reflux condenser was charged with 87 g. (0.5 mole) of 4-chloro-2-nitrophenol, 65.5 (0.55 mole) of propargyl bromide, 44 g. of solid sodium hydroxide and 700 ml. of water. The mixture was stirred and heated on a steam bath for 24 hours. The reaction mixture was acidified with dilute (1:1) hydrochloric acid and allowed to cool to room temperature. The precipitate was filtered and washed well with water. The crude product was suspended in 350 ml. of ethyl acetate. The suspension was washed with 2× 200 of a 5% solution of sodium hydroxide, then with 2× 100 of distilled water, and the organic layer was dried over sodium sulfate and distilled under reduced pressure. The crude residue of 4-chloro-2-nitrophenyl 2-propynyl ether melted at 75–85°. Recrystallized from ethanol it melted at 85–86°.

EXAMPLE 16

Preparation of 2-nitro-4-chlorophenol 3-iodo-2-propynyl ether

Sixty-four grams (0.3 mole) of 4-chloro-2-nitrophenyl 2-propynyl ether and 1200 ml. of methanol were placed into a 2 liter three-neck flask fitted with a mechanical stirrer, reflux condenser and thermometer. The mixture was stirred at 35–40° until solution was completed and 84 g. (0.33 mole) of iodine and 300 ml. of 10% sodium hydroxide solution were added simultaneously. The temperature rose to 50–55° and a white precipitate was formed. The reaction temperature was allowed to cool to room temperature and the mixture was filtered. The cake was washed with a solution of 5% potassium iodide and then with water. The dry 4-chloro-2-nitrophenyl 3-iodo-2-propynyl ether melted at 110–115°. Recrystallized from ethanol it melted at 116–117°.

EXAMPLE 17

Preparation of 4-chloro-6-iodo-2-nitrophenyl 2-propynyl ether

A 500 ml. three-neck flask, fitted with a mechanical stirrer and a reflux condenser, was charged with 18.5 g. (0.062 mole) of 4-chloro-6-iodo-2-nitrophenol, 8.2 g. (0.0067 mole) of propargyl bromide, 9.2 g. (0.067 mole) of potassium carbonate and 200 ml. of acetone. The mixture was stirred and heated to reflux on a steam bath for 30 hours. The reaction mixture was cooled to room temperature and the precipitate of inorganic salt was filtered and the acetone solution distilled under reduced pressure. The almost white residue of 4-chloro-6-iodo-2-nitrophenyl 2-propynyl ether melted at 81–86°. Recrystallized from ligroin it melted at 91–93°.

EXAMPLE 18

Preparation of 4-chloro-6-iodo-2-nitrophenyl 3-iodo-2-propynyl ether

Fifteen grams (0.644 mole) of 4-chloro-6-iodo-2-nitrophenyl ether and 170 ml. of methanol were placed in a 500 ml. three-neck flask provided with a mechanical stirrer and thermometer. The mixture was stirred at 30–35° until solution was complete and 13.7 g. (0.05 mole) of iodine and 40 ml. of 10% sodium hydroxide solution were added simultaneously. The temperature rose to 40–45° and a white precipitate was formed. The reaction mixture was allowed to cool to room temperature and then filtered. The cake was washed with a solution of 5% potassium iodide and then with water. The dry semi-white 4-chloro-6-iodo-2-nitrophenyl 3-iodo-7-propynyl ether recrystallized from ethanol melted at 115–116°.

EXAMPLE 19

2,3-dichloro-1-(3-iodo-2-propynylmercapto)benzene

To a 500 ml. 3-neck round bottom flask equipped with a stirrer and a dropping funnel were charged 40.5 g. (0.25 mole) of 2,3-dichloroaniline and 100 ml. of 6 N aqueous hydrochloric acid. To the chilled solution (0–5°) was added dropwise, a solution of 18.7 g. (0.27 mole) of sodium nitrite in 40 ml. of water over a period of 30 minutes. After stirring for an additional 30 minutes at 0–5°, the reaction was allowed to warm to 20°. The diazonium salt solution was added dropwise to a solution of 46 g. (0.29 mole) of potassium ethyl xanthate in 100 ml. of water over a period of 30 minutes while maintaining a reaction temperature of 40–50°. After the addition was complete the reaction was heated on a steam bath for 1 hour. The reaction was then chilled in an ice bath and extracted three times with 200 ml. of ether. The ether extracts were washed once with 200 ml. of water, dried over anhydrous sodium sulfate, filtered and evaporated at 40° in vacuo. The residue was dissolved in 150 ml. of hot ethanol and transferred to a 500 ml. 3-neck round bottom flask equipped with a stirrer and a reflux condenser. To the solution was added 80 g. (1.4 moles) of potassium hydroxide in small portions over a period of 15 minutes. After the reaction was refluxed for 10 hours, it was chilled with an ice bath and acidified by adding dropwise 150 ml. of an aqueous solution of hydrochloric acid. The solution was extracted three times with 200 ml. of ether. The ether extracts were combined and washed three times with 100 ml. of water, dried over anhydrous sodium sulfate, filtered and evaporated at 40° in vacuo to yield 2,3-dichlorothiophenol which was used without further purification.

To a 500 ml. 3-neck round bottom flask equipped with a stirrer, a dropping funnel and a thermometer were charged 17.1 g. (0.144 mole) of 3-bromopropyne and 50 ml. of pure methanol. To the vigorously stirred solution, which was cooled to 15–20°, were added simultaneously 48 g. (0.19 mole) of iodine in small portions and 180 ml. of a 10 percent aqueous sodium hydroxide solution (0.44 mole) dropwise over a period of 15 minutes while the reaction temperature was kept at 20° C. After stirring for 1 hour longer at room temperature the reaction mixture was diluted with 100 ml. of ether and 50 ml. of water. The aqueous layer was separated and extracted three times with 75 ml. portions of ether. The combined ether extracts were washed once with 100 ml. of water, dried over anhydrous sodium sulfate and evaporated to yield 1-iodo-3-bromopropyne.

To a 250 ml. 3-neck round bottom flask equipped with a stirrer and a reflux condenser were charged 8.9 g. (0.05 mole) of 2,3-dichlorothiophenol, prepared as above, 14.7 g. (0.06 mole) of 1-iodo-3-bromopropyne, prepared as above, 8.3 g. (0.06 mole) of potassium carbonate and 150 ml. of acetone. After the reaction mixture was stirred and refluxed for 8 hours, the solids were filtered and the filtrate was evaporated in vacuo at 60°. The residue was taken up in 250 ml. of petroleum ether (30–60°) and chromatographed on 150 g. of silica gel. After taking a total of 1 liter of petroleum ether (30–60°) eluates which were discarded, the column was eluted with eight 200 ml. portions of a mixture of benzene (1)-petroleum ether (10) which was pooled and evaporated. The residue was crystallized from 50 ml. of petroleum ether (30–60°) to give 2,3-dichloro-1-(3-iodo-2-propynylmercapto)benzene, M.P. 72–74°.

EXAMPLE 20

4-nitro-1-(3-iodo-2-propynylmercapto)benzene

To a 1 liter three-neck round bottom flask equipped with a stirrer and a reflux condenser were charged 23 g. (0.15 mole) of p-nitrothiophenol, 55 g. (0.22 mole) of 1-ido-3-bromopropyne prepared as in Example 19, 27.9 g. (0.20 mole) of potassium carbonate and 400 ml. of acetone. After the reaction mixture was stirred and refluxed for 8 hours, it was cooled to room temperature. The solids were slurried in 500 ml. of petroleum ether (B.P. 30-60°), filtered and washed with 500 ml. of petroleum ether. The solids were dissolved in 400 ml. of hot ethanol and the insolubles were filtered. After the solution was chilled, the crystals were filtered to obtain 4-nitro-1-(3-iodo-2-propynylmercapto)benzene, M.P. 174-175° C.

EXAMPLE 21

Preparation of 4-nitro-1-(2-propynylmercapto)benzene

To a 500 ml. 3-neck round bottom flask equipped with a stirrer and dropping funnel were charged 31 g. (0.2 mole) of 4-nitrothiophenol and 84 ml. (0.21 mole) of a 10% aqueous sodium hydroxide solution. To the stirred solution was added dropwise 26 g. (0.22 mole) of propargyl bromide over a period of 15 minutes keeping the reaction temperature between 25° and 30° C. After stirring 1 hour at room temperature the precipitate was filtered, washed with 200 ml. of water and dried in a vacuum oven at 50° C. to yield 4-nitro-1-(2-propynylmercapto)benzene, M.P. 95-97° C.

EXAMPLE 22

Preparation of 2-nitro-4-chloro-1-(2-propynylmercapto) benzene

To a 500 ml. 3-neck round bottom flask equipped with a stirrer and dropping funnel were charged 20 g. (0.1 mole) of 2-nitro-4-chlorothiophenol and 55 ml. (0.14 mole) of a 10% aqueous sodium hydroxide solution. To the stirred solution was added dropwise 13 g. (0.11 mole) of propargyl bromide over a period of 15 minutes keeping the reaction temperature between 25° and 30° C. After stirring 1 hour at room temperature the precipitate was filtered, washed with 200 ml. of water and dried in a vacuum oven at 60° to yield 2-nitro-4-chloro-1-(2-propylmercapto)benzene, M.P. 134-136° C.

EXAMPLE 23

Preparation of 2-bromo-3-chlorophenyl 2-propynyl ether and 2-bromo-3-chlorophenyl 3-iodo-2-propynyl ether Concentrated sulfuric acid (130 ml.) was placed in a 2-liter, three neck flask fitted with a mechanical stirrer and a thermometer and 19 g. (0.275 mole) of solid sodium nitrite was added over a period of 10-15 minutes with stirring. After the addition was completed the temperature was raised to 70° and the mixture was stirred until all the sodium nitrite was dissolved. The solution was cooled to 5-10° and a solution of 54 g. (0.25 mole) of 2-bromo-3-nitroaniline prepared as in Example 4 in 50 ml. of conc. sulfuric acid and 500 ml. of acetic acid was added slowly at room temperature with stirring. After the addition was completed, the solution was stirred for 2 hours. A solution of 34 g. (0.35 mole) of cuprous chloride in 250 ml. of conc. hydrochloric acid was prepared in a stirred 2-liter three neck flask at room temperature. The reaction mixture was held at 60° for 20 minutes, 800 ml. of ice-water was added and the preciiptate was filtered, washed with water and dried. The crude 2-bromo-3-chloronitrobenzene, recrystallized from 300 cc. of petroleum ether (30-60°) had a melting point of 40-43°.

31 g. of iron, 40 mesh, 200 ml. of water and 3.2 ml. of glacial acetic acid were placed into a 500 ml. three neck flask provided with a stirrer, reflux condenser, thermometer and a dropping funnel. The mixture was refluxed for 30 minutes with stirring. A solution of 23.6 g. (0.1 mole) of 2-bromo-3-chloronitrobenzene in 120 ml. of dioxane was added dropwise to the refluxing mixture. After the addition was completed, stirring and refluxing were continued for one hour. The mixture was cooled to 60° and 21 g. of solid sodium carbonate anl 3 g. of Norit were added. Stirring was continued for an additional 15 minutes and then the mixture was filtered through a thin layer of Hyflo. The cake was washed with 350 ml. of dichloromethane. The dichloromethane was separated from the aqueous phase, washed with water, dried over sodium sulfate and distilled under reduced pressure to give an oily residue of 2-bromo-3-chloroaniline, B.P. 95-98°/0.04 mm.

Concentrated sulfuric acid (72 ml.) was placed in a 1-liter three neck flask fitted with a mechanical stirrer and a thermometer and 7.2 g. (0.50 mole) of solid sodium nitrite was added over a period of 10-15 minutes. After the addition was completed the temperature was raised to 70° and the mixture was stirred until all the sodium nitrite dissolved. The solution was cooled to room temperature and a solution of 20.6 g. (0.10 mole) of 2-bromo-3-chloroaniline in 80 ml. of glacial acetic acid was added portionwise with stirring at such a rate that the reaction temperature remained at about 30°. After the addition was completed, the solution was stirred at room temperature for 2 hours and then at 50° for 30 minutes. The solution was tested with potassium-iodide starch paper for the presence of unreacted sodium nitrite and, because a positive test was obtained, solid urea was added until a negative test was obtained.

The diazonium compound prepared above was added by means of a dropping funnel to a boiling solution of 350 g. of cupric sulfate in 220 ml. of water, contained in a 1-liter three neck flask set up for steam distillation. A current of steam was introduced into the boiling solution while the diazonium solution was added dropwise from the middle neck. The heating was regulated in such a way that the amount of liquid in the flask remained constant. The distillate was extracted with 3 x 150 ml. of ethyl ether, the ether solution was washed with a small amount of water, dried and distilled under reduced pressure. The 2-bromo-3-chlorophenol was obtained as an oil. A small amount, crystallized from petroleum ether (30-65°), melted at 45-47°.

A 250 ml. three neck flask, provided with a mechanical stirrer and a reflux condenser, was charged with 20.7 g. (0.1 mole) of 2-bromo-3-chlorophenol, 14 g. of potassium carbonate, 13.2 g. of 0.11 mole of propargyl bromide and 100 ml. of acetone. The mixture was stirred and heated to reflux on a steam bath for 8 hours. The reaction mixture was cooled to room temperature and the precipitate of inorganic salt was filtered. The cake was washed with 20 ml. of acetone and the acetone solution was distilled under reduced pressure. The oily residue of 2-bromo-3-chlorophenyl 2-propynyl ether distilled at 72°/0.04 mm.

13 g. (0.1 mole) of 2-bromo-3-chlorophenyl 2-propynyl ether and 100 ml. of methanol was placed into a 250 ml. three neck flask fitted with a mechanical stirrer, reflux condenser and thermometer. The mixture was stirred at room temperature until solution was complete and 30.8 g. (0.11 mole) of iodine and 90 ml. of 10 percent NaOH solution were added simultaneously. The temperature rose to 40-45° and a white precipitate was formed. The reaction mixture was allowed to cool to room temperature and was filtered. The cake was washed with a solution of 5 percent potassium iodide and then with water. The dry, off-white 2-bromo-3-chlorophenyl 3-iodo-2-propynyl ether melted at 60-68°. A small sample recrystallized from ligroin (60-90°) melted at 81-82°.

EXAMPLE 24

Preparation of 2 - nitro-4-chloro-1-(2-propynylmercapto) benzene and 4-chloro-2-nitro-1-(3-iodo-2-propynylmercapto)benzene To a 500 ml. 3-neck round bottom flask equipped with a stirrer and dropping funnel were charged 20 g. (0.1 mole) of 2-nitro-4-chlorothiophenol and 55 ml. (0.14 mole) of a 10 percent aqueous sodium hydroxide solution. To the stirred solution was added dropwise 13 g.

(0.11 mole) of propargyl bromide over a period of 15 minutes keeping the reaction temperature between 25° and 30° C. After stirring 1 hour at room temperature the precipitate was filtered, washed with 200 ml. of water and dried in a vacuum oven at 60° to yield 2-nitro-4-chloro-1-(2-propynylmercapto)benzene, M.P. 134–136° C.

Into a 250 ml. 3-neck round bottom flask equipped with a stirrer, thermometer and dropping funnel was charged 8 g. (0.08 mole) of cuprous chloride, 20 g. (0.21 mole) of ammonium carbonate and 40 ml. of water. The mixture was stirred and heated to 50° in order to dissolve the solids. To the warm solution was added dropwise a solution of 9.1 g. (0.04 mole) of 4-chloro-2-nitro-1-(2-propynylmercapto)benzene in 40 ml. of dioxane over a period of 15 minutes. After the reaction mixture was stirred vigorously for 30 minutes, the precipitate was filtered, washed with 200 ml. of water and transferred with 200 ml. of water to a 500 ml. 3-neck round bottom flask equipped with a stirrer. To the slurry was added at once a solution of 10 g. (0.04 mole) of iodine, 10 g. (0.06 mole) of potassium iodide and 30 ml. of water. After the reaction mixture was stirred for 1 hour, the solids were filtered and washed four times with 150 ml. of water. The remaining solids were washed three times with 200 ml. of hot benzene. The benzene extracts were evaporated at 60° under reduced pressure. The residue was slurried with 200 ml. of ethanol and filtered to yield 4-chloro-2-nitro-1-(3-iodo-2-propynylmercapto)benzene, M.P. 167–168°.

EXAMPLE 25

Preparation of 2,4-dinitro-1-(2-propynylmercapto)benzene and 2,4-dinitro-1-(3-iodo-2-propynylmercapto)benzene To a 500 ml. 3-neck round bottom flask equipped with a stirrer and dropping funnel were charged 40.8 g. (0.2 mole) of 2,4-dinitrothiophenol and 96 ml. of a 10 percent aqueous solution of sodium hydroxide. To the stirred solution was added dropwise 26 g. (0.22 mole) of 3-bromopropyne over a period of 15 minutes keeping the reaction temperature between 25 and 30°. After stirring 1 hour at room temperature the precipitate was filtered, washed with 200 ml. of water. The solids were crystallized from 100 ml. of benzene to yield 2,4-dinitro-1-(2-propynylmercapto)benzene, M.P. 122–124°.

To a 250 ml. 3-neck round bottom flask equipped with a stirrer, thermometer and a dropping funnel were charged 8 g. (0.08 mole) of cuprous chloride, 20 g. (0.21 mole) of ammonium carbonate and 40 ml. of water. The mixture was stirred and heated to 50° in order to dissolve the solids. To the warm solution was added dropwise a solution of 9.6 g. (0.04 mole) of 2,4-dinitro-1-(2-propynylcercapto)benzene in 50 ml. of dioxane over a period of 15 minutes. After the reaction mixture was stirred vigorously for 30 minutes, the preciptiate was filtered, washed with 200 ml. of water and transferred with 200 ml. of water to a 500 ml. 3-neck round bottom flask equipped with a stirrer. To the slurry was added at once a solution of 10 g. (0.04 mole) of iodine, 10 g. (0.06 mole) of potassium iodide and 30 ml. of water. After the reaction mixture was stirred for 1 hour the solids were filtered and washed four times with 150 ml. of water. The remaining solids were washed three times with 200 ml. of hot benzene. The benzene extracts were evaporated at 60° under reduced pressure. The residue was slurried with 200 ml. of ethanol and filtered to yield 2,4-dinitro-1-(3-iodo-2-propynylmercapto)benzene.

Alternatively, 2,4-dinitro-1-(3-iodo-2-propynylmercapto)benzene was prepared by the following procedure:

To a 250 ml. 3-neck round bottom flask equipped with a stirrer and a reflux condenser were charged 10.2 g. of 2,3-dinitrothiophenol, 14.7 g. (0.06 mole) of 1-iodo-3-bromopropyne, prepared as in Example 19, 8.3 g. (0.06 mole) of potassium carbonate and 150 ml. of acetone. After the reaction mixture was stirred and refluxed for 8 hours, the solids were filtered and the filtrate was evaporated in vacuo at 60°. The residue was crystallized to give 2,3-dinitro-1-(3-iodo-2-propynylmercapto)benzene.

We claim:
1. A compound of the formula

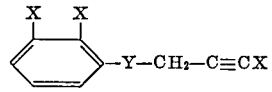

wherein Y is sulfur and X is halogen.

2. A compound of the formula

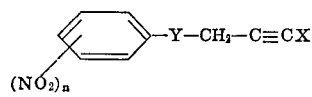

wherein Y is a sulfur atom, X is halogen and $n$ is an integer from 1 to 5.

3. A compound as in claim 2 which is 4-nitro-1-(3-iodo-2-propynylmercapto)benzene.

4. 2-nitro-3-chloro-1-(2-propynylmercapto)benzene.

5. 4-chloro-2-nitro-1-(3-iodo-2-propynylmercapto)benzene.

6. 2,4-dinitro-1-(3-iodo-2-propynylmercapto)benzene.

7. A compound of the formula

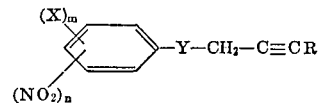

wherein $m$ and $n$ are integers from 1 to 4 such that the sum of $m$ plus $n$ is not greater than 5; X is halogen; R is hydrogen or halogen; and Y is sulfur.

8. A compound of the formula

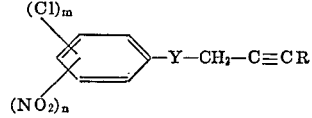

wherein $m$ and $n$ are integers from 1 to 4 such that the sum of $m$ plus $n$ is not greater than 5; R is hydrogen or halogen; and Y is sulfur.

References Cited

Chem. Abstracts, vol. 53, 5112d.
Comptes Rendus Academie des Sciences, pp. 1630–2.

LEWIS GOTTS, Primary Examiner

D. R. PHILLIPS, Assistant Examiner

UNITED STATES PATENT AND TRADEMARK OFFICE
CERTIFICATE OF CORRECTION

PATENT NO. : 3,804,905
DATED : April 16, 1974
INVENTOR(S) : JAY PHILIP O'BRIEN and ALBERT ISRAEL RACHLIN It is certified that error appears in the above-identified patent and that said Letters Patent are hereby corrected as shown below:

Column 20, Claim 4, line 33

"3-chloro-" should be 4-chloro-

[SEAL]

Signed and Sealed this

Twenty-sixth Day of October 1976

Attest:

RUTH C. MASON
*Attesting Officer*

C. MARSHALL DANN
*Commissioner of Patents and Trademarks*